United States Patent Office 2,962,452
Patented Nov. 29, 1960

2,962,452
CERAMIC SEMI-CONDUCTOR COMPOSITIONS
William Edward Counts and Robert Worth Smith, Flint, and Karl Schwartzwalder, Holly, Mich., assignors to General Motors Corporation, Detroit, Mich., a corporation of Delaware
No Drawing. Filed June 12, 1957, Ser. No. 665,110
15 Claims. (Cl. 252—520)

This invention relates to a ceramic composition adapted for use in a semi-conductor material and is a continuation-in-part of our pending application Serial No. 357,906, filed May 27, 1953, now abandoned. More particularly this composition relates to titanate and stanno-titanate type materials which have been modified to produce the desired electrical characteristics in a semi-conductor composition.

Semi-conductors have many useful properties providing such compositions can be made electrically and thermally stable. Since semi-conductors are insulating materials which change their electronic state because of the presence of lattice defects and/or the presence of foreign atoms, the inability to control these properties has limited the use of semi-conductors for industrial applications. Semi-conductors known in the prior art are such materials as ferrites, nickel oxide, copper oxide, silicon carbide and such metals as silicon and germanium.

It is well known in the art that titanium dioxide, normally an excellent insulator, may be given properties of electrical conductivity by treatment in a reducing atmosphere. However, such material has been of no practical use since it was both thermally and electrically unstable, the voltage and temperature coefficients of resistivity being difficult to control.

We have found that in order to obtain a stable semi-conductor having satisfactorily low voltage and temperature coefficients, a combination of modifying agents calcined together was necessary.

From an electrical standpoint, solid materials may be classified into conductors, semi-conductors and insulators. It is difficult to draw distinct boundaries between these three groups, however, it is generally considered that semi-conductors are those materials having a resistivity in the range of $10^{-3}$ to $10^6$ ohm-cm. at room temperature.

Accordingly, it is an object of our invention to provide an inexpensive ceramic material having electrically conductive properties.

It is another object of our invention to provide a ceramic material having electrically stable properties.

It is still another object of our invention to provide a ceramic composition for use in a semi-conductor material having electrical characteristics that are thermally stable.

It is a further object of our invention to provide a ceramic composition for use in a semi-conductor material having characteristics that are both electrically and thermally stable.

Solids, like free atoms, may be visualized as having a large number of electronic energy states the arrangement and population of which in the solid determines its particular characteristics. The density or closeness of these energy states, each state as in the case of the atom comprising an energy distribution of electrons, determines the degree of mobility of the electrons and consequently the electrically conductive qualities of the material. A direct analogy may be found in the movement of vehicle traffic through city streets. Where traffic conditions are heavy and vehicles are packed substantially bumper to bumper, traffic is very slow moving. Conversely, where traffic is light and the distance between cars is relatively great, traffic will move much more rapidly.

As is known in the prior art, titanium dioxide may be heated in a reducing atmosphere such as hydrogen or in a vacuum with the result that neutral oxygen atoms will escape from the crystal leaving electrons behind and producing a material having electrically conductive properties. In titanium dioxide, titanium is not in its lowest valence state so that reduction results in $Ti^{+3}$ ions randomly distributed in the lattice and excess electrons are made available for exhibiting properties of electrical conductivity. In contrast to this accepted theoretical explanation of conductivity by free electrons we have the "hole" concept of conductivity as exemplified in the case of cuprous oxide. In the case of $Cu_2O$ the Cu is in its lowest valence state. On heating $Cu_2O$ in air, $O_2$ is introduced into the lattice. When this is ionized the required electrons are captured from the available valence electrons and $Cu^{+2}$ ions appear in the lattice along with electron vacancies or positive "holes." These vacant sites are pictured as redistributing themselves in the crystal under the influence of an electric field and thus result in a flow of current. In practical cases, where one or several multivalent ions are introduced into a lattice there may be appreciable conductivity by both "holes" and electrons. In the composition herein disclosed the conductivity is probably by both "holes" and electrons.

The compositions disclosed in this application are basically titanates and stanno-titanates which have been modified in order to obtain useful characteristics which are stable and reproducible. The materials so modified produce a semi-conductor of the titanate or stanno-titanate type having low temperature and voltage coefficients of resistivity.

We have found that the presence of $Ta^{+5}$ reduces the resistivity of the titanate and stanno-titanate material to a marked extent. $Ta^{+5}$ has about the same ionic radius as $Ti^{+4}$ but with a higher ionic charge and is visualized as going into the titanium crystal structure and forming "holes." It has been found that as little as 2% of $Ta_2O_5$ lowers the resistivity considerably and the addition of said compound in the amount of 10% reduces the resistance to $\frac{1}{10}$ of that without the addition. Such addition was found to have no effect on the voltage coefficient of resistivity of the composition.

It was also found that both niobium oxide and vanadium oxide, $Nb_2O_5$ and $V_2O_5$, respectively, act in a manner similar to $Ta_2O_5$ though to a lesser degree. For this reason we prefer to use $Ta_2O_5$.

It was also found that the presence of molybdenum or tungsten oxides, alone or in combination, in the titanate or stanno-titanate compositions greatly reduced the voltage coefficient of resistivity. We prefer to use the molybdenum oxide inasmuch as its effect on the voltage coefficient is greater than that of the tungsten oxide.

In order to obtain the characteristics desired, it is necessary to thermally react the semi-conductor constituents. However, it has been found that the reacted composition was not as stable, that is, the electrical properties were not as closely reproducible, as might be desired for some applications. Stability has been attained by the introduction of certain ceramic materials into the mixture prior to calcination. Such materials as tabular corundum, magnesia, mullite, zircon, chrome oxide, etc., have been found to be suitable. We prefer to use tabular corundum, a high temperature calcined alumina, on the basis of results obtained from tests.

The range of compositions yielding the best results are as follows:

| Material: | Limits, parts |
|---|---|
| $TiO_2$ | 15–60 |
| $SnO_2$ | 0–50 |
| $Ta_2O_5$ | up to 15 |
| $MoO_3$ | 0–10 |
| $Al_2O_3$ | 20–40 |

The preferred composition varies with the particular application in mind. As an example, where the semiconductor material is to be utilized in a creep gap or resistor the composition may be

| | Parts |
|---|---|
| $TiO_2$ | 60 |
| $SnO_2$ | 20 |
| $Ta_2O_5$ | 10 |
| $MoO_3$ | 4 |
| $Al_2O_3$ | 40 |

As indicated above, the constituent affecting the thermal stability of the composition may be omitted entirely. We have found that where the alumina or its equivalent, as disclosed herein, is so omitted, the proportion of the remaining constituents in the formula covering the range of compositions and in that covering the preferred composition remain as stated above.

The semi-conductor material in accordance with this invention may be prepared, after weighing out the desired amounts, by thoroughly dry mixing in a Lancaster mill, the constituents being of such size as to pass a 325 mesh screen (43 microns) with most particles being less than 10 microns. The batch is then placed in a suitable container and calcined at a temperature of around 1400° C. in an atmosphere that may be slightly oxidizing, though this is not essential and we do not wished to be limited thereto. For example, a reducing atmosphere may be used thereby giving further control of the resistivity of the material. The calcined material is then ground to the desired state of subdivision, preferably finer than 200 mesh. If desired, the material may be briquetted before firing. The semi-conductor material so formed is then suitable for application in whatever form desired.

The ceramic compositions of our invention have been described with reference to certain preferred embodiments thereof, however, it is to be understood that they may be modified within the limits of our disclosure. For example, the constituent affecting control of the voltage coefficient of resistivity may be omittted where the intended application of the semi-conductor material is such that a high voltage coefficient is desirable.

We claim:

1. A batch for forming semi-conductive ceramic composition having stable electrical properties consisting essentially of 60 parts of $TiO_2$, 20 parts of $SnO_2$, 10 parts of $Ta_2O_5$, 4 parts of $MoO_3$, and 40 parts of $Al_2O_3$.

2. A method of preparing a composition substantially as set forth in claim 1 comprising the steps of weighing out the desired amount of each ingredient, dry mixing the batch of ingredients, placing said batch of mixed ingredients in a suitable receptacle and sintering the material at about 1400° C., the size of said unsintered ingredients being such as to pass a 325 mesh screen with the greater portion thereof being less than ten microns.

3. A ceramic composition formed from a batch consisting of 15 to 60 parts of $TiO_2$, 0 to 50 parts of $SnO_2$, up to 15 parts of a material selected from the class consisting of $Ta_2O_5$, $Nb_2O_5$ and $V_2O_5$, 20 to 40 parts of a material selected from the class consisting of $Al_2O_3$, magnesia, mullite, zircon and chrome oxide, and up to 10 parts of a material selected from the class consisting of $MoO_3$ and $WO_3$ and mixtures thereof, and trace impurities, said $Ta_2O_5$, $Nb_2O_5$ and $V_2O_5$ being present in at least small but effective amounts to reduce the resistance to the desired value and said $MoO_3$ and $WO_3$ being present in at least small but effective amounts to reduce the voltage co-efficient of resistivity to the desired value.

4. A method of preparing a composition substantially as set forth in claim 3 comprising the steps of weighing out the desired amount of each ingredient, dry mixing the batch of ingredients, placing said batch of mixed ingredients in a suitable receptacle and sintering the material at about 1400° C. and grinding said sintered material to desired size.

5. A ceramic composition formed from a batch consisting of 15 to 60 parts of $TiO_2$, 0 to 50 parts of $SnO_2$, up to 15 parts of $Ta_2O_5$, 20 to 40 parts of $Al_2O_3$, up to 10 parts of $MoO_3$, and trace impurities, said $Ta_2O_5$ being present in at least small but effective amounts to reduce the resistance to the desired value, and said $MoO_3$ being present in at least small but effective amounts to reduce the voltage coefficient of resistivity to the desired value.

6. The composition as set forth in claim 5 wherein said $Ta_2O_5$ constitutes at least 2% of the composition.

7. A method of preparing a composition substantially as set forth in claim 5 comprising the steps of weighing out the desired amount of each ingredient, dry mixing the batch of ingredients, placing said batch of mixed ingredients in a suitable receptable and sintering the material at about 1400° C. and grinding said sintered material to desired size.

8. The method in accordance with claim 7 wherein the sintering atmosphere is non-reducing.

9. The method in accordance with claim 7 wherein the sintering atmosphere is slightly oxidizing.

10. A ceramic composition formed from a batch consisting of 15 to 60 parts of $TiO_2$ 0 to 50 parts of $SnO_2$, up to parts of a material selected from the class consisting of $Ta_2O_5$, $Nb_2O_5$ and $V_2O_5$, up to 10 parts of at least one material selected from the class consisting of $MoO_3$ and $Wo_3$, and trace impurities, said $Ta_2O_5$, $Nb_2O_5$ and $V_2O_5$ being present in at least small but effective amounts to reduce the resistance to the desired value and said $MoO_3$ and $Wo_3$ being present in at least small but effective amounts to reduce the voltage co-efficient of resistivity to the desired value.

11. A ceramic composition formed from a batch consisting of 15 to 60 parts of $TiO_2$, 0 to 50 parts of $SnO_2$, up to 15 parts of $Ta_2O_5$, up to 10 parts of $MoO_3$, and trace impurities, said $Ta_2O_5$ being present in at least small but effective amounts to reduce the resistance to the desired value and said $MoO_3$ being present in at least small but effective amounts to reduce the voltage coefficient of resistivity to the desired value.

12. A method of preparing a composition substantially as set forth in claim 10 comprising the steps of weighing out the desired amount of each ingredient, dry mixing the batch of ingredients, placing said batch of mixed ingredients in a suitable receptacle and sintering the material at about 1400° C. and grinding said sintered material to desired size.

13. A method of preparing a composition substantially as set forth in claim 11 comprising the steps of weighing out the desired amount of each ingredient, dry mixing the batch of ingredients, placing said batch of mixed ingredients in a suitable receptacle and sintering the material at about 1400° C. and grinding said sintered material to desired size.

14. The method in accordance with claim 12 wherein the sintering atmosphere is non-reducing.

15. The method in accordance with claim 12 wherein the sintering atmosphere is slightly oxidizing.

References Cited in the file of this patent

UNITED STATES PATENTS

| 2,331,444 | Wainer | Oct. 12, 1943 |
| 2,369,266 | Thurnauer | Feb. 13, 1945 |
| 2,432,250 | Rath | Dec. 9, 1947 |
| 2,533,140 | Rodriguez | Dec. 5, 1950 |
| 2,598,707 | Matthias | June 3, 1952 |
| 2,616,859 | Venvey | Nov. 4, 1952 |
| 2,729,757 | Goodman | Jan. 3, 1956 |

FOREIGN PATENTS

| 574,577 | Great Britain | Jan. 11, 1946 |

OTHER REFERENCES

Johnson et al.: J. Amer. Ceramic Soc., December 1949, vol. 32, No. 12 (pages 398–401).

UNITED STATES PATENT OFFICE
CERTIFICATION OF CORRECTION

Patent No. 2,962,452 November 29, 1960

William Edward Counts et al.

It is hereby certified that error appears in the above numbered patent requiring correction and that the said Letters Patent should read as corrected below.

Column 4, line 24, before "parts" insert -- 15 --; lines 27 and 30, for "Wo3", each occurrence, read -- $WO_3$ --.

Signed and sealed this 9th day of May 1961.

(SEAL)
Attest:

ERNEST W. SWIDER
Attesting Officer

DAVID L. LADD
Commissioner of Patents